United States Patent
Card et al.

(10) Patent No.: US 10,090,695 B2
(45) Date of Patent: Oct. 2, 2018

(54) OPTIMIZED CURRENT PULSE CHARGING APPARATUS AND METHOD EMPLOYING INCREASING CLAMP REFERENCE VOLTAGES AND DECREASING CURRENT PULSES

(71) Applicant: Fairchild Semiconductor Corporation, San Jose, CA (US)

(72) Inventors: Robert A. Card, Scarborough, ME (US); Ming Chuen Alvan Lam, Scarborough, ME (US)

(73) Assignee: Fairchild Semiconductor Corporation, Phoenix, AZ (US)

( * ) Notice: Subject to any disclaimer, the term of this patent is extended or adjusted under 35 U.S.C. 154(b) by 133 days.

(21) Appl. No.: 14/834,577

(22) Filed: Aug. 25, 2015

(65) Prior Publication Data

US 2016/0064957 A1    Mar. 3, 2016

Related U.S. Application Data

(60) Provisional application No. 62/044,128, filed on Aug. 29, 2014.

(51) Int. Cl.
*H02J 7/00* (2006.01)

(52) U.S. Cl.
CPC ............ *H02J 7/007* (2013.01); *H02J 7/0029* (2013.01); *H02J 7/0068* (2013.01); *H02J 7/0093* (2013.01)

(58) Field of Classification Search
CPC ...................................................... H02J 7/007
USPC ........................................................ 320/129
See application file for complete search history.

(56) References Cited

U.S. PATENT DOCUMENTS

| | | | | |
|---|---|---|---|---|
| 3,590,358 A | * | 6/1971 | Ruben | H02J 7/0086 320/141 |
| 3,597,673 A | * | 8/1971 | Burkett | H02J 7/0093 320/129 |
| 3,626,270 A | * | 12/1971 | Burkett | H02J 7/0093 320/129 |
| 4,163,933 A | | 8/1979 | Foster | |
| 4,385,269 A | * | 5/1983 | Aspinwall | H02J 7/0086 320/129 |
| 4,829,225 A | * | 5/1989 | Podrazhansky | H01M 10/44 320/129 |

(Continued)

FOREIGN PATENT DOCUMENTS

| | | |
|---|---|---|
| CN | 1582521 A | 2/2005 |
| EP | 0748524 A4 | 5/1997 |

(Continued)

*Primary Examiner* — Robert Grant
*Assistant Examiner* — John Trischler
(74) *Attorney, Agent, or Firm* — Brake Hughes Bellermann LLP

(57) ABSTRACT

This document discusses, among other things, apparatus and methods to optimize charging of a battery, including providing a first charge profile configured to provide charge current pulses to a battery in a plurality of steps. In the first charge profile, the charge current pulses can be stepped down in the plurality of steps using a comparison of a terminal voltage of the battery to a clamp voltage. When the terminal voltage meets or exceeds the clamp voltage, a high time current of the charge current pulse can be decreased and the clamp voltage can be increased before providing a subsequent charge current pulse.

18 Claims, 4 Drawing Sheets

(56) References Cited

U.S. PATENT DOCUMENTS

| | | | |
|---|---|---|---|
| 5,367,244 A | 11/1994 | Rose et al. | |
| 5,412,306 A | 5/1995 | Meadows et al. | |
| 5,442,274 A * | 8/1995 | Tamai | H02J 7/0093 320/146 |
| 5,481,174 A * | 1/1996 | Martin | H02J 7/0093 320/129 |
| 5,598,085 A * | 1/1997 | Hasler | H02J 7/0091 320/141 |
| 5,694,023 A * | 12/1997 | Podrazhansky | H01M 10/44 320/129 |
| 5,726,554 A * | 3/1998 | Freiman | H02J 7/0093 320/112 |
| 5,889,385 A * | 3/1999 | Podrazhansky | H02J 7/0016 320/130 |
| 6,040,684 A * | 3/2000 | Mitchell | H01M 10/44 320/139 |
| 6,060,865 A * | 5/2000 | Chen | H02J 7/0093 320/139 |
| 6,097,172 A | 8/2000 | Podrazhansky et al. | |
| 6,229,285 B1 * | 5/2001 | Ding | H01M 10/44 320/132 |
| 6,366,056 B1 | 4/2002 | Podrazhansky et al. | |
| 6,441,588 B1 * | 8/2002 | Yagi | H02J 7/0091 320/139 |
| 6,563,318 B2 * | 5/2003 | Kawakami | G01R 31/3679 320/132 |
| 6,788,028 B2 | 9/2004 | Lee | |
| 6,841,974 B2 * | 1/2005 | Dykeman | H02J 7/0093 320/141 |
| 6,853,166 B1 * | 2/2005 | Chang | H02J 7/345 320/167 |
| 7,821,233 B2 * | 10/2010 | Nate | H02J 7/06 320/134 |
| 8,134,342 B2 * | 3/2012 | Labrunie | H01M 10/4264 320/141 |
| 8,193,777 B2 * | 6/2012 | Nakashima | H01M 2/16 320/141 |
| 8,228,042 B2 * | 7/2012 | Kurihara | H01M 10/0525 307/116 |
| 8,368,357 B2 * | 2/2013 | Ghantous | G01R 31/3637 320/134 |
| 8,427,112 B2 * | 4/2013 | Ghantous | G01R 31/3637 320/137 |
| 8,513,921 B2 * | 8/2013 | Berkowitz | G01R 31/3637 320/141 |
| 8,638,070 B2 * | 1/2014 | Maluf | H02J 7/0052 320/141 |
| 8,791,669 B2 * | 7/2014 | Ghantous | G01R 31/3637 320/139 |
| 8,803,473 B2 * | 8/2014 | Lu | H02J 7/0093 320/107 |
| 8,907,631 B1 * | 12/2014 | Gurries | H02J 7/0073 307/43 |
| 8,970,178 B2 * | 3/2015 | Berkowitz | B60L 11/1861 320/129 |
| 8,975,874 B2 * | 3/2015 | Berkowitz | H02J 7/0052 320/141 |
| 9,035,621 B2 * | 5/2015 | Berkowitz | G01R 31/3637 320/134 |
| 9,121,910 B2 * | 9/2015 | Maluf | G01R 31/3637 |
| 9,373,972 B2 * | 6/2016 | Ghantous | H02J 7/0052 |
| 9,385,555 B2 * | 7/2016 | Ghantous | H02J 7/0052 |
| 9,461,492 B1 * | 10/2016 | Berkowitz | H02J 7/0052 |
| 2002/0070710 A1 * | 6/2002 | Yagi | H02J 7/0091 320/150 |
| 2003/0111980 A1 * | 6/2003 | Lee | H02J 7/0027 320/143 |
| 2004/0032237 A1 * | 2/2004 | Dykeman | H02J 7/0093 320/141 |
| 2005/0040793 A1 * | 2/2005 | Chang | H02J 7/345 320/166 |
| 2005/0225299 A1 * | 10/2005 | Petrovic | H02J 7/0093 320/141 |
| 2008/0203969 A1 * | 8/2008 | Kurihara | H01M 10/0525 320/116 |
| 2010/0066309 A1 * | 3/2010 | Labrunie | H01M 10/4264 320/141 |
| 2010/0164437 A1 * | 7/2010 | McKinley | H01M 10/049 320/145 |
| 2011/0285356 A1 * | 11/2011 | Maluf | H02J 7/0052 320/139 |
| 2011/0316548 A1 * | 12/2011 | Ghantous | G01R 31/3637 324/427 |
| 2012/0032648 A1 * | 2/2012 | Ghantous | G01R 31/3637 320/139 |
| 2012/0200266 A1 * | 8/2012 | Berkowitz | B60L 11/1861 320/139 |
| 2012/0203483 A1 * | 8/2012 | Ghantous | G01R 31/3637 702/63 |
| 2013/0026976 A1 * | 1/2013 | Lu | H02J 7/0093 320/107 |
| 2013/0154548 A1 * | 6/2013 | Berkowitz | G01R 31/3637 320/107 |
| 2014/0021959 A1 * | 1/2014 | Maluf | G01R 31/3637 324/430 |
| 2014/0028249 A1 | 1/2014 | Larsen et al. | |
| 2014/0139192 A1 * | 5/2014 | Berkowitz | H02J 7/0052 320/141 |
| 2014/0266068 A1 * | 9/2014 | O'Brien | H02J 7/0093 320/139 |
| 2014/0312912 A1 * | 10/2014 | Berkowitz | G01R 31/3637 324/426 |
| 2014/0327406 A1 * | 11/2014 | Hempel | H02J 7/0093 320/129 |
| 2014/0375275 A1 * | 12/2014 | Hung | B60L 3/003 320/139 |
| 2015/0137741 A1 * | 5/2015 | Gurries | H02J 7/0073 320/107 |
| 2015/0153417 A1 * | 6/2015 | Maluf | B60L 11/1861 324/426 |
| 2015/0155734 A1 * | 6/2015 | Ghantous | H02J 7/0052 320/107 |
| 2015/0219722 A1 * | 8/2015 | Maluf | G01R 31/3637 324/426 |
| 2015/0377976 A1 * | 12/2015 | Maluf | G01R 31/3679 702/63 |
| 2015/0380957 A1 * | 12/2015 | Ghantous | H02J 7/0052 320/134 |
| 2016/0344202 A1 * | 11/2016 | Johnson | H02J 7/0093 |
| 2017/0229877 A1 * | 8/2017 | Zhang | H02J 7/0044 |

FOREIGN PATENT DOCUMENTS

| | | |
|---|---|---|
| WO | WO-9508197 A1 | 3/1995 |
| WO | WO-9732384 A1 | 9/1997 |

* cited by examiner

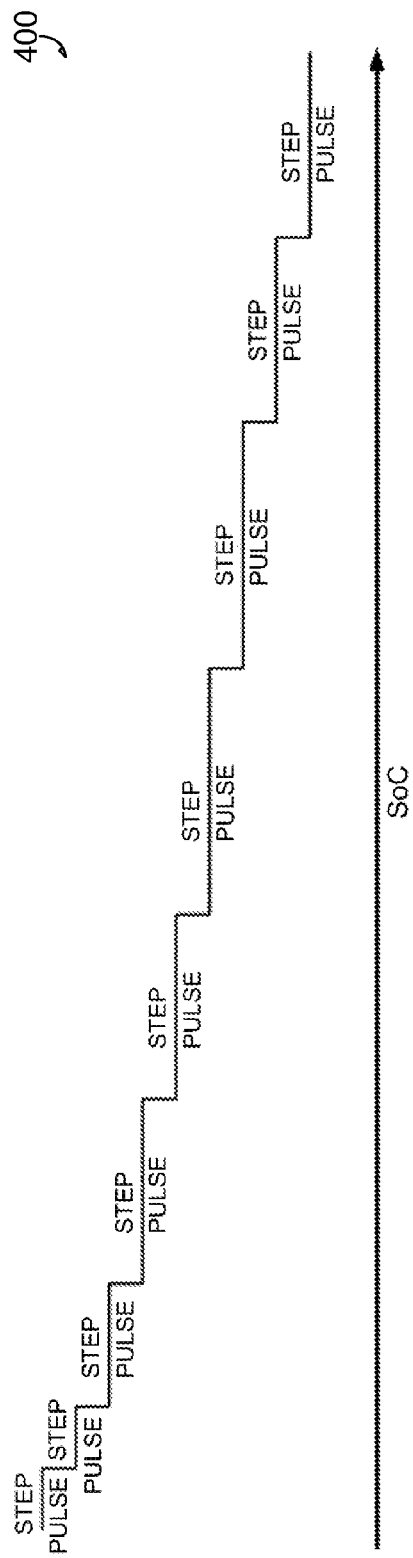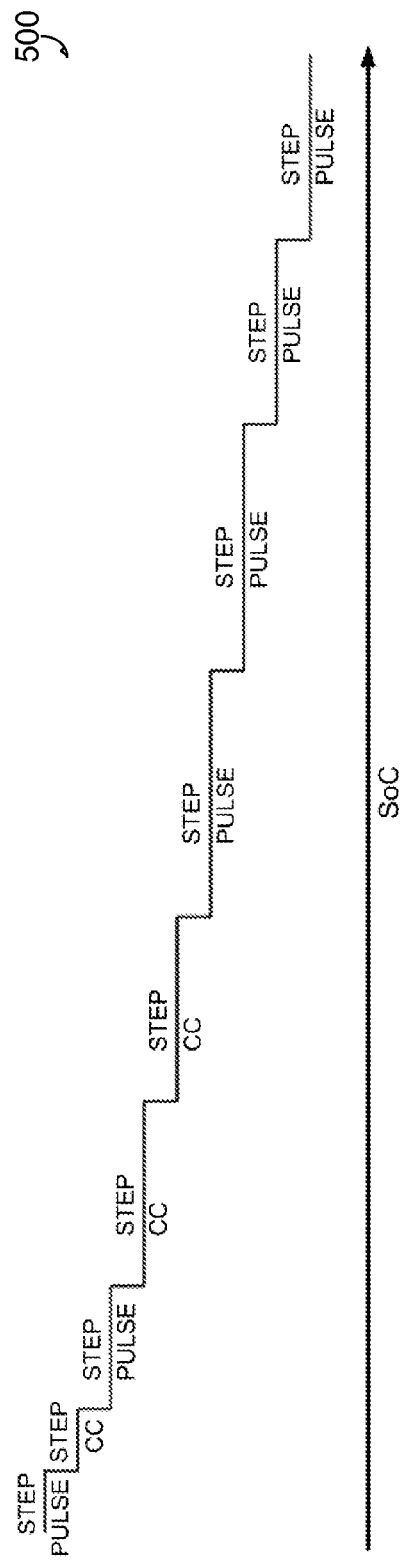

OPTIMIZED CURRENT PULSE CHARGING APPARATUS AND METHOD EMPLOYING INCREASING CLAMP REFERENCE VOLTAGES AND DECREASING CURRENT PULSES

CLAIM OF PRIORITY

This application claims the benefit of priority under 35 U.S.C. § 119(e) of Robert A. Card et al. U.S. Provisional Patent Application Ser. No. 62/044,128, titled "OPTIMIZED CHARGING ALGORITHM WITH STAIRCASE, PULSING, DISCHARGE PROFILE," filed on Aug. 29, 2014, which is incorporated by reference herein in its entirety.

BACKGROUND

Various charging apparatus and methods for rechargeable cells have been developed to increase battery life or decrease charge time.

One existing charge profile is a stepped constant-current (CC) charge profile, such as disclosed in Stephen D. Rose et al. U.S. Pat. No. 5,367,244, titled "Battery charging method with stepped current profile and associated charger," to Premier Engineered Products, Inc. (herein, "Rose et al."). In Rose et al., a constant charging current is provided to a battery. The constant charging current is reduced by a step current when the voltage of the battery equals a target voltage.

A pulsing charge profile is disclosed in Yury M. Padrazhansky et al. U.S. Pat. No. 6,366,056, titled "Battery charger for lithium based batteries," to Enrev Corporation (herein, "Padrazhansky et al."). In Padrazhansky et al., alternating series of charge current pulses, discharge pulses, and rest periods are provided to a battery.

A pulsing and constant voltage charge profile is disclosed in Seung-Won Lee U.S. Pat. No. 6,788,028, titled "Charging a battery using constant voltage and pulse," to Sk Teletech Co., Ltd. (herein, "Lee"). In Lee, pulse charging is applied at a first current level until the charging pulse width is greater than a reference pulse width, then constant voltage charging is applied.

OVERVIEW

This document discusses, among other things, apparatus and methods to optimize charging of a battery, including providing a first charge profile configured to provide charge current pulses to a battery in a plurality of steps. In the first charge profile, the charge current pulses can be stepped down in the plurality of steps using a comparison of a terminal voltage of the battery to a clamp voltage. When the terminal voltage meets or exceeds the clamp voltage, a high time current of the charge current pulse can be decreased and the clamp voltage can be increased before providing a subsequent charge current pulse.

In an example, the high time current can be stepped down from an initial high time current in a plurality of steps until the high time current is less than or equal to a first threshold. If the high time current is less than or equal to the first threshold, a plurality of charge current pulses can be provided to the battery in a second, pulse-only charge profile that does not include the plurality of steps of the first charge profile.

In certain examples, the high time current can be decreased in the second charge profile as the terminal voltage approaches a maximum clamp voltage until the high time current is less than or equal to a second threshold. If the high time current is less than or equal to the second threshold, a current can be provided to the battery in a third charge profile to maintain a constant voltage at the battery. The current provided to the battery in the third charge profile can be decreased using the terminal voltage and the maximum clamp voltage until the current is less than or equal to a third threshold.

In an example, in the first charge profile, if the terminal voltage is greater than or equal to the clamp voltage, at the end of a step, a discharge current pulse can be provided to the battery prior to a subsequent charge current pulse, e.g., the first charge current pulse of the subsequent step. At each step, the high time current can be decreased by a step current and the clamp voltage can be increased by a step voltage, and each step can include a plurality of charge current pulses having equal high time current. In an example, the step current and the step voltage are fixed amounts. In other examples, the step current and the step voltage can be varying amounts, e.g., increasing or decreasing with each step.

In certain examples, the plurality of steps can include 16 steps, and the number of charge current pulses in each step can be determined in response to the comparison of the terminal voltage to the clamp voltage. The plurality of charge current pulses in the first or second charge profiles can have a set duty cycle, low time current, and period.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIGS. 4-5 illustrate generally example charge step combinations.

DETAILED DESCRIPTION

The present inventors have recognized, among other things, an optimized charging apparatus and method configured to provide charge current pulses to a battery in a plurality of steps in a first charge profile, maximizing current to the battery while a terminal voltage of the battery voltage is below a specified state of charge (SoC). As the SoC increases, charge current can be decreased, for example, using information from the battery. The first charge profile can provide higher charging current to the battery with a lower average terminal voltage, less harm to the cycle life, a decreased charge time, and an increased battery lifespan in contrast to existing charge profiles. Further, for a lithium-ion battery, providing charge current pulses with a rest period between pulses can help decrease the concentration gradient of lithium-ions intercalating through a solid electrolyte interphase (SEI) and into an anode of the battery during charging.

Figure 1:
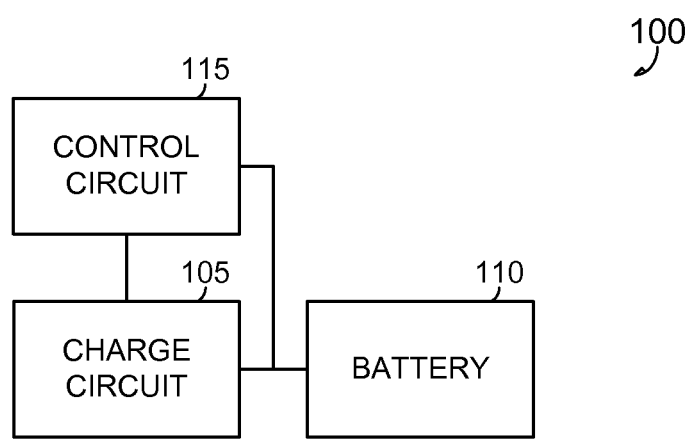
FIG. 1 illustrates generally an example optimized charging system.

FIG. 1 illustrates generally an example optimized charging system 100 including a charge circuit 105, a battery 110, and a control circuit 115. The charge circuit 105 configured to provide charge current pulses to the battery 110 in a plurality of steps in a first charge profile, and to provide charge current pulses to the battery 110 in a second charge profile, the charge current pulses having a high time current and a low time current.

The control circuit 115 can be configured to receive information from the battery 110, such as a terminal voltage, and to control the charge circuit 105, such as the high time current, the low time current, or one or more other charge circuit 105 setting, using the received battery information. The terminal voltage of the battery naturally tracks the open circuit voltage (OCV) of the battery, as well as the internal impedance. The control circuit 115 can use the terminal voltage of the battery 110 as a feedback mechanism to step down the charge current provided by the charge circuit 105, as described herein.

The control circuit 115 can be configured to control the charge current pulses, including the plurality of steps in the first charge profile, such that high current pulsing is provided when the terminal voltage of the battery is lower, e.g., between 0-25% SoC, and decreasing charge current as the terminal voltage of the battery increases, e.g., as the SoC increases. In an example, the control circuit 115 can be configured to control the charge current provided by the charge circuit 105 using a comparison of the terminal voltage to a clamp voltage until the charge current is less than or equal to a threshold. Further, the clamp voltage can be adjusted as the terminal voltage of the battery 105 changes.

In an example, the control circuit 105 can be configured to provide a current to the battery in a third charge profile to maintain a constant voltage at the battery 110. The control circuit 105 can decrease the current to the battery 110 using the terminal voltage, e.g., using a comparison of the terminal voltage and a maximum clamp voltage for the battery 110, until the high time current is less than or equal to a threshold.

Figure 2:
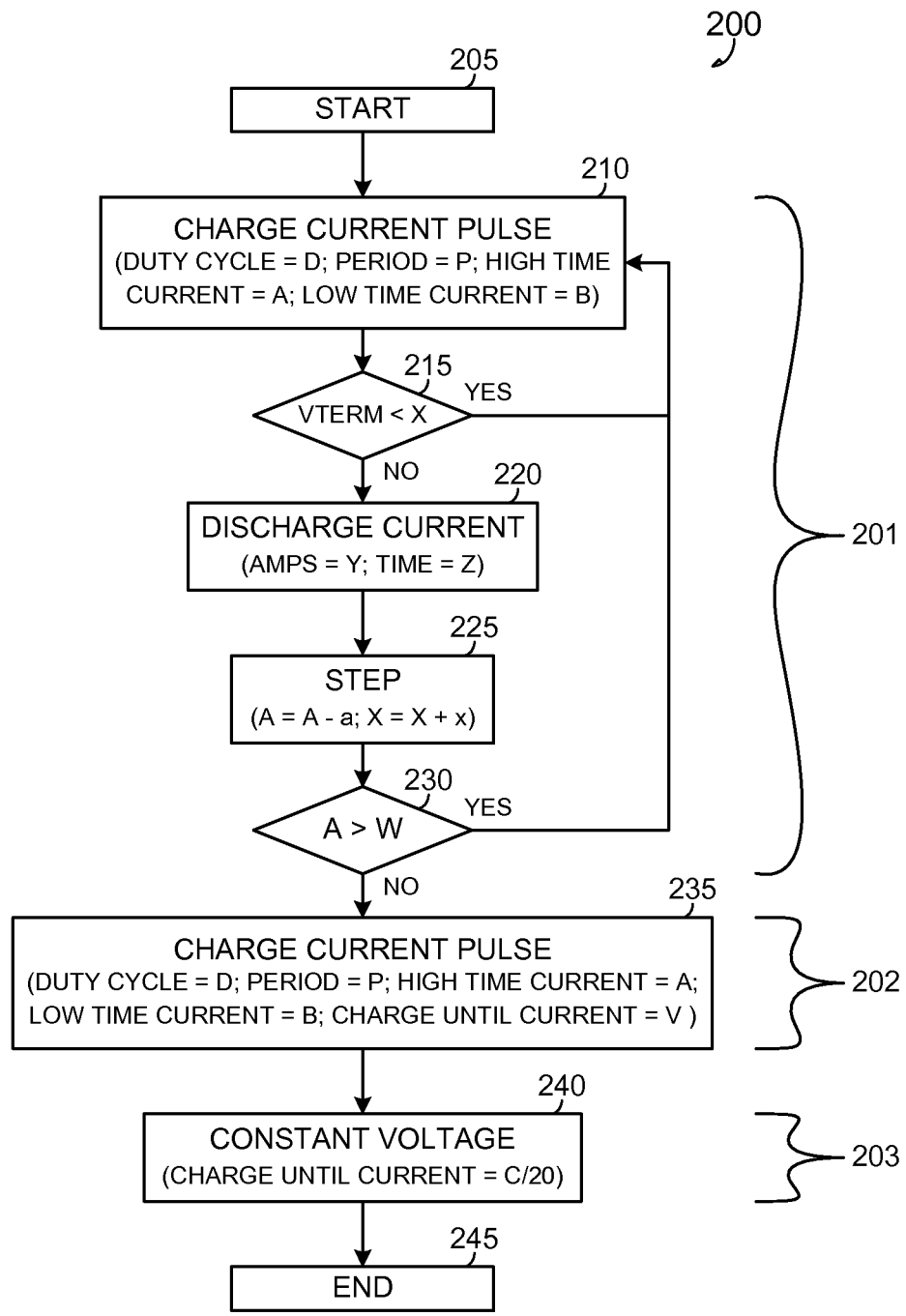
FIG. 2 illustrates generally an example optimized charging algorithm (OCA).

FIG. 2 illustrates generally an example optimized charging algorithm (OCA) 200 including first, second, and third charge profiles 201, 202, 203 configured to charge a battery. In an example, the first charge profile 201 can include a pulsing, stepped charge profile configured to provide a plurality of charge current pulses in a plurality of steps down from an initial high time current as the battery charges. The second charge profile 202 can include a pulsing-only charge profile configured to provide a plurality of charge current pulses, but not including the plurality of steps from the first charge profile 201. The third charge profile 203 can include a constant voltage charge profile.

At 205, the OCA 200 starts. At 210, a charge current pulse can be provided having a duty cycle (D), a period (P), a high time current (A), and a low time current (B). In an example, the duty cycle can be 80% high time followed by 20% low time, the period can be 1 second, the high time current can be 1.5 capacity rate (C rate), and the low time current can be 0 amps. The C rate for a battery is the rated discharge current for one hour, e.g., a 1 C rate battery can provide 1000 mA for 1 hour. In other examples, the duty cycle can range between 50-100% high time, the period can range between 1 msec and 10 seconds, the high time current can range between 0.7-5 C, and the low time current can range from 0 amps to 50% of the high time current. In an example, the 1 second, 1 Hz impedance frequency is a very low impedance frequency for lithium-ion batteries, and can provide better aging performance.

In an example, a control circuit can be configured to receive a terminal voltage ($V_{TERM}$) of the battery, and compare the terminal voltage to one or more values. At 215, if the terminal voltage is less than an initial clamp voltage (X), process can return to step 210, and another charge current pulse is provided having the same high time current and low time current. At 215, if the terminal voltage is not greater than the initial clamp voltage, process can continue to step 220.

In an example, for a battery with a maximum terminal voltage of 4.35V, the initial clamp voltage can be 3.8V. In other examples, the initial clamp voltage can range between 3.5V and the maximum terminal voltage of the battery, e.g., the maximum terminal voltage published by the battery vender.

At 220, an optional discharge current can be provided having a discharge current (Y) for a discharge time (Z). The discharge current can be provided at the end of each step, when charging is at its apex, to provide lithium plating reversal for lithium-ion batteries. In an example, the discharge current can be −1 A, and the discharge time can be 200msec. In other examples, the discharge current can range between −200 mA and −5 A, and the discharge time can range between 10 msec and 5 seconds. In certain examples, step 220 can be omitted.

At 225, because the terminal voltage of the battery is less than a clamp voltage, the high time current of the charge current pulse can be stepped down from its current value by a step current (a), and the clamp voltage can be increased from its current value by a step voltage (x). In an example, the step current can be 100 mA, and the step voltage can be 50 mV. In other examples, the step current can range between 1-500 mA, and the step voltage can range between 1-250 mV. In an example, the first charge profile 201 can include 16 steps.

In an example, the control circuit can be configured to compare the high time current to a first threshold (W). At 230, if the high time current is greater than or equal to the first threshold, process can return to step 210, and the first charge profile 201 can be repeated. In an example, the first threshold can include a 1.0 C. In other examples, the first threshold can range between 0.5-2 C.

At 230, if the high time current is not greater than the first threshold (W), the first charge profile 201 can end, the second charge profile 202 can begin, and process can continue to step 235.

At 235, a second charge profile 202 can be provided, including providing charge current pulses using the high time current from the end of the first charge profile 201. In an example, the duty cycle, period, and low time current can be the same as the first charge profile 201. The high time current, at step 235, can be adjusted using a comparison of the terminal voltage to the clamp voltage. The clamp voltage can include the clamp voltage from the end of the first charge profile 201, or a maximum clamp voltage for the battery. In an example, at 235, charge current pulses can be provided until the high time current is less than or equal to a second threshold (V). In an example, the second threshold can be C/15. In other examples, the second threshold can range between C/5 and C/20.

At 240, a third charge profile 203 can be provided, including providing a constant current to maintain a constant voltage at the battery. The constant current can be decreased using the terminal voltage and the maximum clamp voltage until the current is less than or equal to a third threshold. In an example, the third threshold can be C/20. In other examples, the third threshold can range between C/10 and C/30.

At 245, the OCA 200 ends. In an example, the OCA 200 can restart in one or more of the first, second, or third charge profiles 201, 202, 203, depending on the SoC of the battery, e.g., determined using the terminal voltage of the battery. In an example, a reset can return process flow to step 205, and the OCA 200 can start again.

In the examples above, one or more ranges or values are provided. It is understood that such ranges and values are examples, and that in other examples, such as when other batteries having other maximum clamp voltage, etc., other ranges or values can be used.

Figure 3:
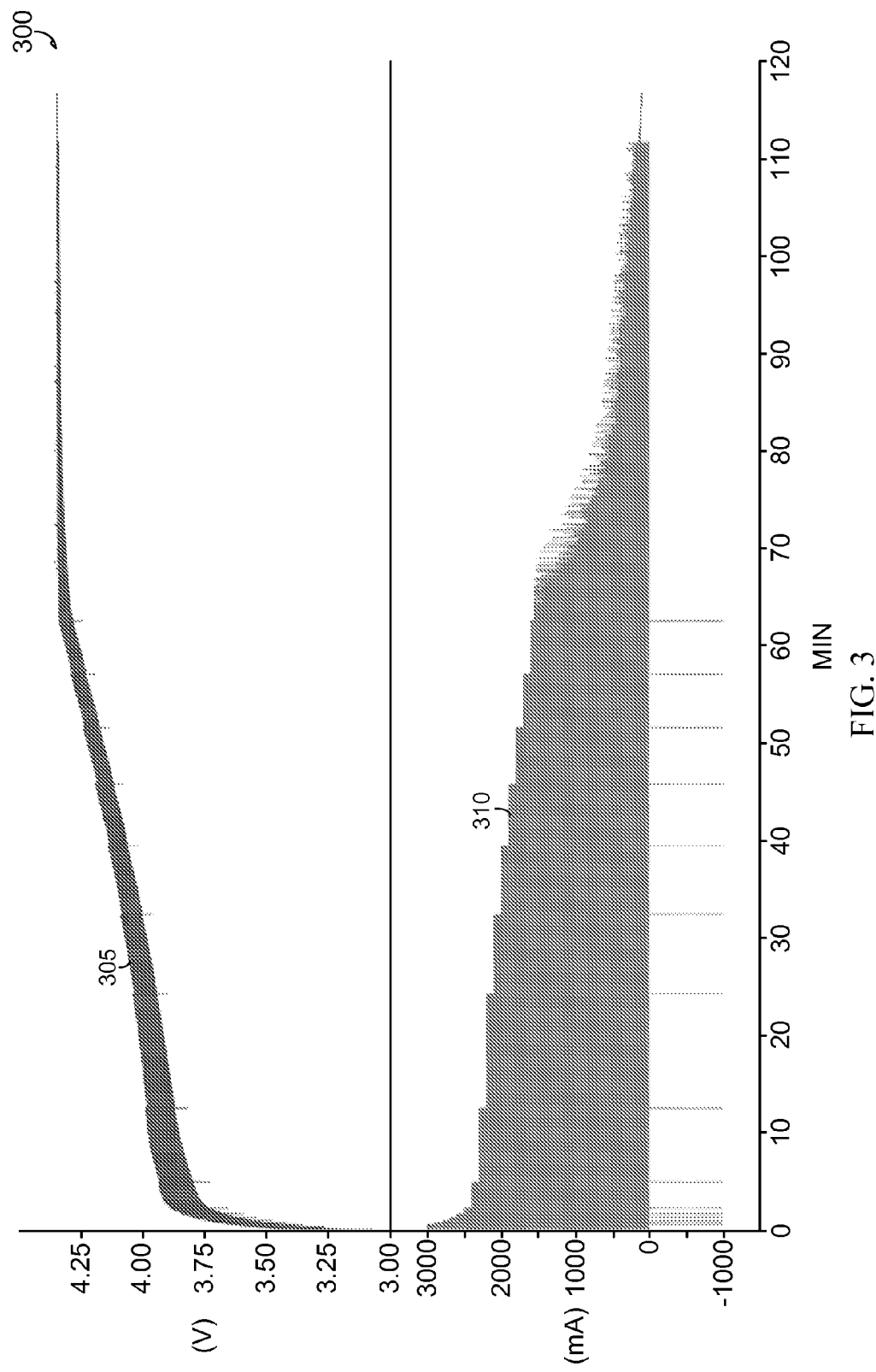
FIG. 3 illustrates generally an example charge profile.

FIG. 3 illustrates generally an example charge profile 300 including a battery voltage 305 and a battery current 310 of a battery charged using an example OCA, such as that described herein, including first, second, and third charge profiles. In this example, the first charge profile is illustrated between approximately minutes 0 and 62, and includes a plurality of charge current pulses, one per second, across 16 steps. In each step, the high time current of the plurality of charge current pulses is equal within the step. In the example of FIG. 3, each step ends with a −1 A discharge pulse.

The second charge profile is illustrated between approximately minutes 62 and 111, and includes a plurality of charge current pulses in a pulse-only mode, where the high time current of each charge current pulse is determined using the terminal voltage of the battery.

The third charge profile is illustrated after approximately minute 111, where a current is provided, the current decreasing, and eventually ending as the terminal voltage settles at a maximum clamp voltage.

In other examples, other values, such as high time current, low time current, discharge current, clamp voltage, the number of steps, etc., can include values other than those illustrated in FIG. 3, depending on battery parameters, desired charging characteristics, etc.

FIGS. 4-5 illustrate generally example charge step combinations 400, 500. In certain examples, individual steps within the first charge profile can be altered to provide one or more other charge modes within the step. FIG. 4 illustrates generally an example portion of a first charge profile including a plurality of steps, each consisting of charge current pulses. In contrast, FIG. 5 illustrates generally an example portion of a first charge profile including a plurality of steps, where selected steps include constant current (CC) within the selected step (e.g., 100% duty cycle, zero rest time). In other examples, one or more other steps or charge modes can be selected within at least a portion of one or more steps.

In certain examples, the decision criterion to select a constant current step or a pulsing step can depend on, among other things, the age of the battery; the SoC of the battery; a desired or required charge time, etc. In general, a constant current charge mode provides a faster charge time, but with more damage to the battery, the damage increasing as the SoC increases.

The OCA described herein can provide, among other things, in contrast to existing charge profiles: faster charge time between 0-50% SoC; faster charge time between 0-75% SoC; and equal or longer battery life. For example, for 0-50% SoC charging, the OCA disclosed herein can be ~30% faster than traditional 0.6 C (1250 mA) CCCV. There is a similar improvement for 0-75% SoC charging.

ADDITIONAL NOTES AND EXAMPLES

In Example 1, an optimized charging apparatus includes a charge circuit configured to provide a plurality of charge current pulses to a battery in a first charge profile, the charge current pulses having a high time current and a low time current, a control circuit configured to receive a terminal voltage of the battery and to, in the first charge profile, step down the high time current in a plurality of steps using a comparison of the terminal voltage to a clamp voltage. In the first charge profile, if the terminal voltage is greater than or equal to the clamp voltage, the control circuit is configured to decrease the high time current and increase the clamp voltage.

In Example 2, the control circuit of Example 1 is optionally configured to step down the high time current from an initial high time current in a plurality of steps until the high time current is less than or equal to a first threshold.

In Example 3, if the high time current of any one or more of Examples 1-2 is less than or equal to the first threshold, the charge circuit of any one or more of Examples 1-2 is optionally configured to provide a plurality of charge current pulses to the battery in a second charge profile, including a pulse-only charge profile, that does not include the plurality of steps of the first charge profile.

In Example 4, the control circuit of any one or more of Examples 1-3 is optionally configured to decrease the high time current in the second charge profile using the terminal voltage and a maximum clamp voltage until the high time current is less than or equal to a second threshold.

In Example 5, if the high time current of any one or more of Examples 1-4 is less than or equal to the second threshold, the charge circuit of any one or more of Examples 1-4 is optionally configured to provide a current to the battery in a third charge profile to maintain a constant voltage at the battery, and the control circuit of any one or more of Examples 1-4 is optionally configured to decrease the current provided to the battery in the third charge profile using the terminal voltage and the maximum clamp voltage until the current is less than or equal to a third threshold.

In Example 6, if the terminal voltage of any one or more of Examples 1-5 is greater than or equal to the clamp voltage, the charge circuit of any one or more of Examples 1-5 is optionally configured to provide a discharge current pulse to the battery prior to a subsequent charge current pulse.

In Example 7, at each step of any one or more of Examples 1-6, the control circuit of any one or more of Examples 1-6 is optionally configured to decrease the high time current by a step current and to increase the clamp voltage by a step voltage, and each of the plurality of steps in the first charge profile of any one or more of Examples 1-6 optionally includes a plurality of charge current pulses having equal high time current.

In Example 8, the step current and the step voltage of any one or more of Examples 1-7 are optionally fixed amounts.

In Example 9, the plurality of steps of any one or more of Examples 1-8 optionally includes 16 steps, and the number of charge current pulses in each step is optionally determined in response to the comparison of the terminal voltage to the clamp voltage.

In Example 10, the plurality of charge current pulses in the first charge profile of any one or more of Examples 1-9 optionally have a set duty cycle and period.

In Example 11, an optimized charging method includes providing a plurality of charge current pulses to a battery in a first charge profile, the charge current pulses having a high time current and a low time current, and stepping down, in the first charge profile, the high time current in a plurality of steps using a comparison of a terminal voltage of the battery to a clamp voltage. Stepping down the high time current includes providing a first charge current pulse to the battery, comparing the terminal voltage to a clamp voltage, and if the terminal voltage is greater than or equal to the clamp voltage, decreasing the high time current and increasing the clamp voltage.

In Example 12, if the terminal voltage of any one or more of Examples 1-11 is greater than or equal to the clamp voltage, the stepping down the high time current of any one or more of Examples 1-11 optionally includes providing a second charge current pulse to the battery using the decreased high time current and, after providing the second charge current pulse to the battery, comparing the terminal voltage to the increased clamp voltage.

In Example 13, the stepping down the high time current in the first charge profile of any one or more of Examples 1-12 optionally includes stepping down the first charge profile from an initial high time current in a plurality of steps until the high time current is less than or equal to a first threshold.

In Example 14, any one or more of Examples 1-13 optionally includes providing a plurality of charge current pulses to the battery in a second charge profile after the high time current is less than or equal to the first threshold, wherein the second charge profile is optionally a pulse-only charge profile that does not include the plurality of steps of the first charge profile.

In Example 15, any one or more of Examples 1-14 optionally includes decreasing the high time current in the second charge profile using the terminal voltage and a maximum clamp voltage until the high time current is less than or equal to a second threshold.

In Example 16, any one or more of Examples 1-15 optionally includes providing a current to the battery in a third charge profile configured to maintain a constant voltage at the battery after the high time current is less than or equal to the second threshold, and decreasing the current provided to the battery in the third charge profile using the terminal voltage and the maximum clamp voltage until the current is less than or equal to a third threshold.

In Example 17, any one or more of Examples 1-16 optionally includes providing a discharge current pulse to the battery prior to stepping down the high time current in the first charge profile.

In Example 18, the stepping down the high time current in the first charge profile of any one or more of Examples 1-17 optionally includes, at each of the plurality of steps, decreasing the high time current by a step current and increasing the clamp voltage by a step voltage, and each of the plurality of steps in the first charge profile of any one or more of Examples 1-17 optionally includes a plurality of charge current pulses having equal high time current.

In Example 19, the step current and the step voltage of any one or more of Examples 1-18 optionally are fixed amounts.

In Example 20, the plurality of steps of any one or more of Examples 1-19 optionally includes 16 steps, and the number of charge current pulses in each step of any one or more of Examples 1-19 is optionally determined in response to the comparing the terminal voltage to the clamp voltage.

In Example 21, a system or apparatus can include, or can optionally be combined with any portion or combination of any portions of any one or more of Examples 1-20 to include, means for performing any one or more of the functions of Examples 1-20, or a machine-readable medium including instructions that, when performed by a machine, cause the machine to perform any one or more of the functions of Examples 1-20.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. An optimized charging apparatus, comprising:
a charge circuit configured to provide a plurality of charge current pulses to a battery; and
a control circuit configured to:
receive a terminal voltage of the battery,
compare the terminal voltage of the battery to a clamp voltage, and
compare a value for a high time current to a threshold current value;
based on determining that the terminal voltage of the battery is less than the clamp voltage, the charge circuit is configured to provide a plurality of first charge current pulses to the battery in a first step of a first charge profile, each of the plurality of the first charge current pulses having a same first duty cycle, a same high time current at a first value, and a same low time current,
based on determining that the terminal voltage of the battery is greater than or equal to the clamp voltage, the charge circuit is configured to, in the first charge profile, step down the high time current by providing a discharge current pulse to the battery, and by decreasing the first value for the high time current by a step current value resulting in a second value for the high time current, and
based on determining that the second value for the high time current is greater than the threshold current value, the charge circuit is configured to provide a second charge current pulse to the battery in a second step of the first charge profile, the second charge current pulse having the first duty cycle, a high time current at the second value, and the low time current.

2. The optimized charging apparatus of claim 1, wherein the control circuit is configured to step down the high time current by decreasing a value for the high time current in a plurality of steps until the value for the high time current is less than or equal to the threshold current value, each step being a step of the first charge profile, and each value for the high time current being decreased by the step current value.

3. The optimized charging apparatus of claim 2, wherein, based on determining that the value for the high time current is less than or equal to the threshold current value, the charge circuit is configured to provide a plurality of charge current pulses to the battery in a second charge profile, including a pulse-only charge profile, that does not include the plurality of steps of the first charge profile.

4. The optimized charging apparatus of claim 3, wherein the control circuit is configured to decrease a value of the high time current in the second charge profile using the terminal voltage and a maximum clamp voltage until the value of the high time current is less than or equal to a second threshold current value.

5. The optimized charging apparatus of claim 4, wherein, based on determining that the value of the high time current is less than or equal to the second threshold current value, the charge circuit is configured to provide a current to the battery in a third charge profile to maintain a constant voltage at the battery, and
wherein the control circuit is configured to decrease the current provided to the battery in the third charge profile using the terminal voltage and the maximum clamp voltage until the current is less than or equal to a third threshold current.

6. The optimized charging apparatus of claim 1, wherein based on determining that the terminal voltage of the battery is greater than or equal to the clamp voltage, the charge circuit is further configured to, in the first charge profile, step down the high time current by increasing the clamp voltage by a step voltage.

7. The optimized charging apparatus of claim 6, wherein the step current value and the step voltage are respective fixed amounts.

8. The optimized charging apparatus of claim 1, wherein a number of first charge current pulses in the first step is determined in response to the comparison of the terminal voltage to the clamp voltage.

9. The optimized charging apparatus of claim 1, wherein each of the plurality of first charge current pulses in the first charge profile has a same period.

10. An optimized charging method, comprising:
providing a plurality of first charge current pulses to a battery in a first step of a first charge profile, each of the plurality of the first charge current pulses having a same first duty cycle, a same high time current at a first value, and a same low time current, the providing occurring while a terminal voltage of the battery is determined to be less than a clamp voltage; and
responsive to determining that the terminal voltage of the battery is greater than or equal to the clamp voltage, stepping down, in the first charge profile, the high time current including:
providing a discharge current pulse to the battery; and
decreasing the first value for the high time current by a step current value resulting in a second value for the high time current; and
based on determining that the second value for the high time current is greater than a threshold current value, providing a second charge current pulse to the battery in a second step of the first charge profile, the second charge current pulse having the first duty cycle, a high time current at the second value, and the low time current.

11. The optimized charging method of claim 10, further comprising, after providing the second charge current pulse to the battery in the second step of the first charge profile, comparing the terminal voltage to the clamp voltage.

12. The optimized charging method of claim 10, wherein stepping down the high time current in the first charge profile further includes decreasing a value for the high time current in a plurality of steps until the value for the high time current is less than or equal to the threshold current value, each step being a step of the first charge profile, and each value for the high time current being decreased by the step current value.

13. The optimized charging method of claim 12, further including:
based on determining that the value for the high time current is less than or equal to the threshold current value, providing a plurality of charge current pulses to the battery in a second charge profile,
wherein the second charge profile is a pulse-only charge profile that does not include the plurality of steps of the first charge profile.

14. The optimized charging method of claim 13, including:
decreasing a value of the high time current in the second charge profile using the terminal voltage and a maximum clamp voltage until the value of the high time current is less than or equal to a second threshold current value.

15. The optimized charging method of claim 14, further including:
based on determining that the value of the high time current is less than or equal to the second threshold current value, providing a current to the battery in a third charge profile, the third change profile being configured to maintain a constant voltage at the battery; and
decreasing the current provided to the battery in the third charge profile using the terminal voltage and the maximum clamp voltage until the current is less than or equal to a third threshold current.

16. The optimized charging method of claim 10, wherein the stepping down the high time current in the first charge profile further includes increasing the clamp voltage by a step voltage.

17. The optimized charging method of claim 16, wherein the step current value and the step voltage are respective fixed amounts.

18. The optimized charging method of claim 10, wherein a number of first charge current pulses in the first step is determined in response to the comparison of the terminal voltage to the clamp voltage.

* * * * *

UNITED STATES PATENT AND TRADEMARK OFFICE
CERTIFICATE OF CORRECTION

PATENT NO. : 10,090,695 B2
APPLICATION NO. : 14/834577
DATED : October 2, 2018
INVENTOR(S) : Card et al.

It is certified that error appears in the above-identified patent and that said Letters Patent is hereby corrected as shown below:

In the Claims

In Column 12, Line 2, Claim 15, delete "third change" and insert -- third charge --, therefor.

In Column 12, Line 19, Claim 18, delete "the comparison" and insert -- a comparison --, therefor.

Signed and Sealed this
Thirteenth Day of November, 2018

Andrei Iancu
*Director of the United States Patent and Trademark Office*